(12) United States Patent
Chi (10) Patent No.: US 8,593,795 B1
(45) Date of Patent: Nov. 26, 2013

(54) WEIGHT DISTRIBUTION FOR WEARABLE COMPUTING DEVICE

(75) Inventor: Liang-Yu (Tom) Chi, San Francisco, CA (US)

(73) Assignee: Google Inc., Mountain View, CA (US)

( * ) Notice: Subject to any disclaimer, the term of this patent is extended or adjusted under 35 U.S.C. 154(b) by 213 days.

(21) Appl. No.: 13/206,184

(22) Filed: Aug. 9, 2011

(51) Int. Cl.
*G06F 1/16* (2006.01)

(52) U.S. Cl.
USPC ............... 361/679.03; 351/221; 455/575.3; 312/334.46

(58) Field of Classification Search
USPC .......... 351/158, 117, 129, 156, 221;
455/569.1, 556.1, 575.1, 575.2, 575.3,
455/158, 420, 655, 589, 166, 168, 169, 1.1,
455/173, 174; 361/679.08, 679.54, 679.01,
361/679.28, 679.17, 679.55, 679.41,
361/679.27; 359/13, 15; 345/173, 184, 168,
345/163, 211, 690, 97; 312/334.1, 323,
312/293.1, 237, 319.2, 231.1, 231.2, 334.46
See application file for complete search history.

(56) References Cited

U.S. PATENT DOCUMENTS

| | | | |
|---|---|---|---|
| 5,302,977 A | | 4/1994 | Markovitz et al. |
| 5,682,173 A | | 10/1997 | Holakovszky et al. |
| 5,886,822 A | | 3/1999 | Spitzer |
| 5,906,635 A | * | 5/1999 | Maniglia ........................ 607/57 |
| 6,091,546 A | | 7/2000 | Spitzer |
| 6,474,816 B2 | | 11/2002 | Butler et al. |
| 6,480,174 B1 | | 11/2002 | Kaufmann et al. |
| 7,278,734 B2 | | 10/2007 | Jannard et al. |
| 7,310,072 B2 | | 12/2007 | Ronzani et al. |
| 7,410,254 B2 | | 8/2008 | Goodis |
| 7,500,747 B2 | | 3/2009 | Howell et al. |
| 7,581,833 B2 | | 9/2009 | Howell et al. |
| 7,753,520 B2 | | 7/2010 | Fuziak, Jr. |
| 7,771,046 B2 | | 8/2010 | Howell et al. |
| 7,792,552 B2 | | 9/2010 | Thomas et al. |
| 7,798,638 B2 | * | 9/2010 | Fuziak, Jr. ..................... 351/158 |

(Continued)

FOREIGN PATENT DOCUMENTS

| | | |
|---|---|---|
| GB | 2444626 | 6/2008 |
| WO | 03/048838 | 6/2003 |

OTHER PUBLICATIONS

Spitzer, M.B., et al., "Eyeglass-Based Systems for Wearable Computing," The MicroOptical Corporation, Oct. 13, 1997; taken from the Internet on Feb. 28, 2011 from http://citeseerx.ist.psu.edu/viewdoc/download?doi= 1 0.1.1.40.9070&rep=rep 1 &type=pdf.

*Primary Examiner* — Hung Duong
(74) *Attorney, Agent, or Firm* — McDonnell Boehnen Hulbert & Berghoff LLP (57) ABSTRACT

The present application discloses a wearable computing device having a plurality of components, with the weight of the components being evenly distributed on the wearable computing device. One embodiment may include a frame having a front portion and at least one side-arm extending therefrom. The at least one side-arm has a first end and a second end. The wearable computing device further includes a lens connected to the front portion of the frame and at least one display element mounted to the lens and to the first end of the at least one side-arm of the frame by a tensile member. An electronic device is mounted to the second end of the at least one side-arm of the frame to counterbalance the mass located at the front portion of the frame. The electronic device may include batteries, circuitry, processors, computers, and other electronic components.

27 Claims, 4 Drawing Sheets

(56) References Cited

U.S. PATENT DOCUMENTS

| | | |
|---|---|---|
| 7,810,750 B2 | 10/2010 | Abreu |
| 7,922,321 B2 | 4/2011 | Howell et al. |
| 8,109,629 B2 | 2/2012 | Howell et al. |
| 2006/0132382 A1 | 6/2006 | Jannard |
| 2007/0046889 A1 | 3/2007 | Miller et al. |
| 2007/0200998 A1* | 8/2007 | Schrimmer et al. .......... 351/158 |
| 2008/0291277 A1 | 11/2008 | Jacobsen et al. |
| 2009/0168131 A1 | 7/2009 | Yamaguchi et al. |
| 2009/0185131 A1 | 7/2009 | Esbensen |
| 2010/0238395 A1 | 9/2010 | Laustsen et al. |
| 2012/0233735 A1* | 9/2012 | Rhodenizer ...................... 2/22 |

* cited by examiner

WEIGHT DISTRIBUTION FOR WEARABLE COMPUTING DEVICE

BACKGROUND

Some systems for displaying information may utilize "heads-up" displays. A heads-up display is typically positioned near the user's eyes to allow the user to view displayed images or information with little or no head movement. To generate the images on the display, a computer processing system may be used. Such heads-up displays have a variety of applications, such as aviation information systems, vehicle navigation systems, and video games.

One type of heads-up display is a head-mounted wearable display or computing device. Various technologies can be incorporated into wearable electronics and displays such as music players integrated into the frames of eyewear, eyewear radio devices, as well as wearable computers. A wearable display or computing device can be in the form of a pair of eyeglasses or a helmet that the user can wear. These eyeglasses may contain computing components, input devices, display elements (such as a monitor or projector), as well as glass lenses, making them significantly heavier than typical eyeglasses. Typical eyeglasses weigh in the range of about 7 g-50 g. The wearable display, however, can weigh anywhere from 75 g-120 g, which is about 2 to 3 times (or more) the weight of normal eyeglasses. Attempts to reduce the mass of the wearable display have included the use of lighter materials where possible in order to reduce the overall mass of the device.

SUMMARY

In one embodiment, an example wearable computing device includes a frame including a front portion and at least one side-arm extending therefrom, the at least one side-arm having a first end and a second end, a lens connected to the frame, a display element mounted to the lens and to the first end of the at least one side-arm of the frame, and at least one electronic device for counterbalancing the weight of the frame, lens, and display element. The electronic device is mounted to the second end of the side-arm of the frame.

In another embodiment, an example wearable computing device includes a frame including a front portion and at least one stem extending therefrom, the at least one side-arm having a first end and a second end, a lens connected to the frame, means for projecting an image mounted to the lens and to the first end of the at least one side-arm of the frame, means for mounting the projecting means to the first end of the at least one side-arm of the frame, and means for counterbalancing the weight of the frame, lens, and projecting means mounted to the second end of the at least one side-arm of the frame.

In another embodiment, an example wearable computing device includes a frame having a front portion and at least one side-arm extending therefrom. The at least one side-arm has a first end and a second end. The wearable computing device further includes a lens connected to the frame, a display element mounted to the lens and to the first end of the at least one side-arm of the frame, a tensile member for mounting the display element to the first end of the at least one side-arm, and at least one electronic device for counterbalancing the weight of the frame, lens, and display element. The electronic device is mounted to the second end of the at least one side-arm of the frame.

In yet another embodiment, an example wearable computing device includes a frame having a front portion with first and second side-arms extending therefrom. The first and second side-arms each have first and second ends. The wearable computing device further includes a first lens and a second lens each connected to the front portion of the frame. A first display element is mounted to the first lens and to the first end of the first side-arm of the frame by a first tensile sleeve, and a second display element is mounted to the second lens and to the first end of the second side-arm of the frame by a second tensile sleeve. The wearable computing device further includes a first electronic device mounted to the second end of the first side-arm of the frame to counterbalance the weight of the frame, the first lens, and the first display element, and a second electronic device mounted to the second end of the second side-arm of the frame to counterbalance the weight of the frame, the second lens, and the second display element.

In yet another embodiment, an example wearable computing device includes a frame having a front portion and at least one side-arm extending therefrom. The at least one side-arm has a first end and a second end. The wearable computing device further includes a lens connected to the front portion of the frame, a nose piece extending from the front portion of the frame, and at least one display element mounted to the lens and to the first end of the at least one side-arm of the frame by a tensile sleeve. The tensile sleeve is constructed of a material having high tensile strength and low compressive strength. The wearable computing device also includes an electronic device mounted to the second end of the at least one side-arm of the frame. The electronic device counterbalances the weight of the frame, lens, and display element.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

The following detailed description describes various features and functions of the disclosed systems and methods with reference to the accompanying figures. In the figures, similar symbols typically identify similar components, unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

The present application is directed to a wearable computing device or display, which may be in the form of eyeglasses. The lenses and the display element of the glasses are located in the front of the glasses near the user's eyes. That mass in front of the glasses can be counterbalanced by placing the mass of the electronics of the device, such as batteries and a computer, back behind the ears of a wearer. The ears will then act as a cantilever or fulcrum to counterbalance the mass in the front of the glasses. Placing mass in the wearable device in a location behind the ears also shortens the distance between the center of gravity of the wearable computing device and a user's ears, which in turn lowers the moment of force about the ears and allows the wearer to feel the weight of the glasses less, and to turn their head faster and more easily while wearing the glasses.

A slight movement of the lenses or frame with respect to each other may disrupt the location of the image projecting onto the lens of the glasses. Thus, the lenses may be connected to the frame at only one location, near the nose piece of the glasses, and are not connected to each other. This helps prevent the lenses from bending or moving with respect to each other and to the frame. In other embodiments, however, the lenses may be connected to each other.

Further, a tensile member or sleeve may connect the display element to the frame. The tensile sleeve may be made out of a material having high tensile strength and little or no compressive strength to support the display element without disrupting the position of the frame with respect to the lenses and display element. This configuration helps maintain the frame in the correct position with respect to both the display element and the lenses so the display stays in the correct position on the lens with respect to the eyes of the wearer.

Figure 1:
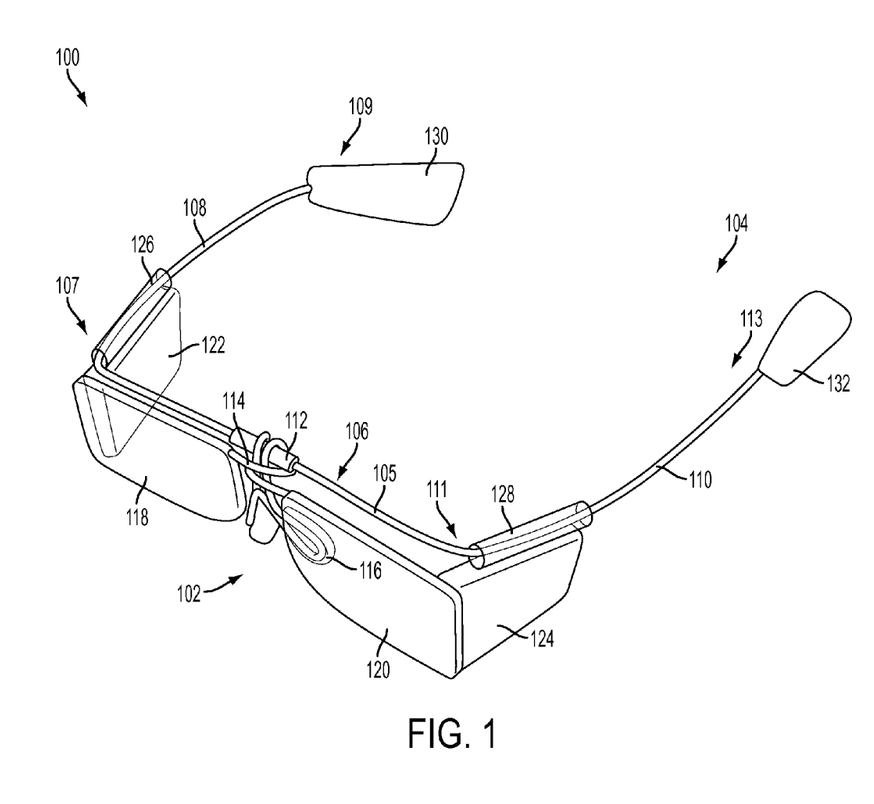
FIG. 1 is an example wearable computing device according to one embodiment of the present application.

FIG. 1 illustrates an example system for receiving, transmitting, and displaying data. The system is shown in the form of a wearable computing device 100. While FIG. 1 illustrates eyeglasses as an example of a wearable computing device, other types of wearable computing devices could additionally or alternatively be used. The wearable computing device 100 may display images and/or graphics to a user in the form of a heads-up display.

In one embodiment, a computing device (not shown) may be incorporated into the wearable computing device or eyeglasses. In another embodiment, the computing device may be a head-mounted computing device incorporated into, for example, a hat or helmet, or may be a body-mounted computing device incorporated into, for example, a waist-mounted cell phone or personal digital assistant. The connection between the computing device and the eyeglasses may be a wired and/or wireless link. A wired link may include, for example, a parallel bus or a serial bus such as a Universal Serial Bus (USB). A wireless link may include, for example, Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The connection may function to transmit data and/or commands to and/or from the wearable computing device 100 and/or to transmit display data for display at the wearable computing device 100.

In the example embodiment shown in FIG. 1, the wearable computing device 100 may include a head-mounted display, such as eyeglasses. Alternatively, the wearable computing device may comprise a hat, helmet, visor, garments, contact lenses, or goggles, for example. The wearable computing device 100 may include a front portion 102 and a back portion 104. The front portion 102 of the wearable computing device 100 may be placed near the user's eyes and the back portion 104 may be placed near the side or back of the user's head.

The wearable computing device 100 may further include a frame 106. The frame 106 may be constructed of a relatively lightweight yet strong and rigid material, such as titanium, aluminum, carbon fiber, magnesium, or stainless steel, for example. The frame 106 may include a front portion 105 located near the front portion 102 of the wearable computing device 100, and at least one side-arm, such as first side-arm 108. The first side-arm 108 may have a first end 107 located near the front portion 102 of the wearable computing device 100. The first side-arm 108 may also have a second end 109 located near the back portion 104 of the wearable computing device 100. In some embodiments, the first side-arm 108 may extend entirely or mostly around a user's head. Additionally or alternatively, the frame 106 may further include a second side-arm 110. The second side-arm 110 may have a first end 111 located near the front portion 102 of the wearable computing device 100. The second side-arm 110 may also have a second end 113 located near the back portion 104 of the wearable computing device 100. In an example embodiment, the first and second side-arms 108, 110 may extend outwardly away from the front portion 102 of the wearable computing device 100 toward the back portion 104.

The front portion 105 of the frame 106 may further include a nose piece 112 extending therefrom toward the front portion 102 of the wearable computing device 100. The nose piece 112 may be located near one or more lenses 118, 120, and may be placed on or near the user's nose. The nose piece 112 may include a first portion 114 and a second portion 116. In one example embodiment, the first and second portions 114, 116 may be projections protruding from the nose piece 112.

In an example embodiment, a first lens 118 may be connected to the first portion 114 of the nose piece 112 and a second lens 120 may be connected to the second portion 116 of the nose piece 112. In other embodiments, the lenses 118, 120 may be connected to the frame 106 at a different location, such as by a rigid member which establishes a fixed orientation of the lenses relative to each other. The lenses 118, 120 may be placed in front of a user's eyes and may be made out of glass, for example. Alternatively, the lenses 118, 120 may be made of any material that can suitably display a projected image or graphic.

The projected image or graphic on the lens or lenses 118, 120 is configured to be aligned with the user's eyes. A slight movement of the lenses 118, 120 or frame 106 with respect to each other may disrupt the location of the image or graphic projecting onto the lens. Thus, in one embodiment, the lenses 118, 120 may be connected to the frame 106 at only one location, such as near the nose piece 112 of the wearable computing device 100. Further, the lenses 118, 120 may not be connected to each other. The limited connections and the rigid frame 106 help to prevent movement of one of the lenses 118, 120 or the frame 106 from being translated to and impacting the other components. Thus, movement of the one of the lenses does not affect the other, and movement of the frame 106 does not affect the position of the lenses 118, 120. In other embodiments, however, the lenses may be connected to each other.

One or more display elements 122 may be connected to the frame 106 and to lens 118. The display element 122 may include a monitor or small projector to project an image and/or graphic onto the lens 118. The display element 122 may further include an optical coupling and any other components used for displaying an image and/or graphic onto the lens 118. In some embodiments, a second display element 124 may be attached to the frame 106 and to lens 120. Thus, the wearable computing device 100 may be a monocular (projecting an image onto one lens) or binocular (projecting an image onto both lenses) design. The display elements 122, 124 may be secured to the lenses 118, 120 at a location away from the nose piece 112 by any suitable fastening means, such as adhesive, for example.

In alternative embodiments, other types of display elements may also be used. For example, the lenses 118, 120 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame 106 for driving such a matrix display. Alternatively or additionally, a laser or LED source and scanning system could be used to draw a raster display directly onto the retina of one or more of the user's eyes. Other possibilities exist as well.

Figure 2:
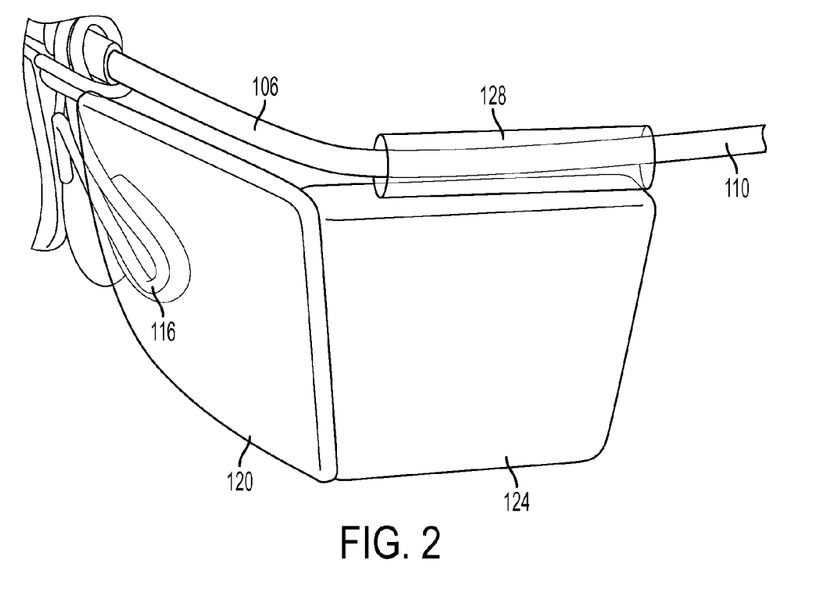
FIG. 2 is a close-up view of a front portion of the wearable computing device shown in FIG. 1.

In one example embodiment, one or both of the display elements 122, 124 may be secured to respective side-arms 108, 110 of the frame 106 by tensile members such as tensile sleeves 126, 128, as shown in FIG. 2. The tensile sleeves 126, 128 help maintain the frame 106 in position with respect to both the display elements 122, 124 and the lenses 118, 120 so the projected image or graphic remains in position and alignment on the lens with respect to the eyes of the user. The tensile sleeves 126, 128 may further provide structural stability to the wearable computing device 100.

The tensile sleeves 126, 128 may be made out of a material having high tensile strength, or ability to withstand axially directed pulling forces, and little or no compressive strength, or ability to withstand axially directed pushing forces. Thus, the tensile sleeves 126, 128 are strong when pulled upon, but easily and readily fold or compress when pushed. These properties enable the tensile sleeves 126, 128 to support the display elements 122, 124 on the frame 106 without translating forces from the frame 106 to the lenses 118, 120 and display elements 122, 124. Examples of such materials include Kevlar® (poly-paraphenylene terephthalamide), plastic, or other similar materials. In some embodiments, the tensile members may comprise a series of small strings or a rubber band-like connecting strip, for example.

As described above, the lenses 118, 120, the nose piece 112, and the display elements 122, 124 are located near the front portion 102 of the wearable computing device 100 near the user's eyes, and apply a force on the user's nose and face. The mass of the lenses 118, 120, the nose piece 112, and the display elements 122, 124 on the front portion 102 of the wearable computing device 100 can be counterbalanced by placing a mass of other components of the wearable computing device 100 on the back portion 104 of the wearable computing device 100, such as at a location behind the ears of the user. The mass behind the ears of the user will then act as a cantilever to counterbalance the mass on the front portion 102 of the wearable computing device 100. Further, in some embodiments, the front portion 102 of the frame be made of one material, and the back portion 104 of the frame may be made of a different material to help evenly distribute weight on the wearable computing device 100.

Figure 3A:
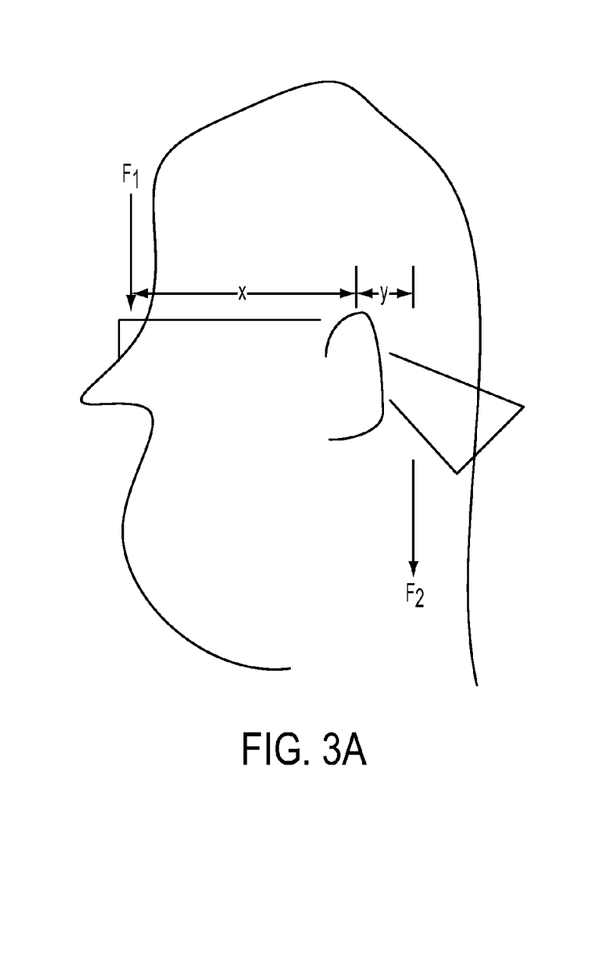
FIG. 3a is a schematic view of the forces acting on a user of the wearable computing device shown in FIG. 1.

FIG. 3a shows an example schematic of the forces acting on a user of the wearable computing device 100. A downward force $F_1$ may be applied to the nose of the user by the mass of a portion of the frame 106, the display elements 122, 124, and the lenses 118, 120 located at the front portion 102 of the wearable computing device 100. Thus, a counterbalancing downward force $F_2$ could be applied to the back portion 104 of the wearable computing device 100 to balance the front force $F_1$. The counterbalancing force $F_2$ may operate to reduce the amount of weight on the user's nose and face by distributing the weight across the user's ears and the back of the user's head, thus making the wearable display more comfortable for the user. In one example, additional mass(es) may be placed near the second ends 109, 113 of the side-arms 108, 110 to create the counterbalancing force $F_2$.

The front force $F_1$ is placed at a distance x from the pivot point, which is the ear of the user. The counterbalancing force $F_2$ is placed at a distance y from the ear. In an example embodiment, $F_1(x)=F_2(y)$ such that the moment of force is balanced about the ear. Thus, the moments acting on a user of the wearable computing device are equal about the ear of the user, thus reducing the weight felt by the user on the nose of that user. In other embodiments, the moments of force may not be equal, but the moment of force caused by $F_2$ will reduce the weight of the glasses felt by the user on the user's nose.

Example components that can be placed on the back portion 104 of the wearable computing device 100 to create the counterbalancing downward force $F_2$ may include electronic devices 130, 132. The electronic devices 130, 132 may include batteries, circuitry, processors, computers, computing devices, and other electronic components, for example. The balancing of the components on the wearable computing device 100 between the front 102 and back 104 portions may create a more comfortable and enjoyable experience for the user by taking bothersome force and pressure off of the user's face and nose.

Figure 3B:
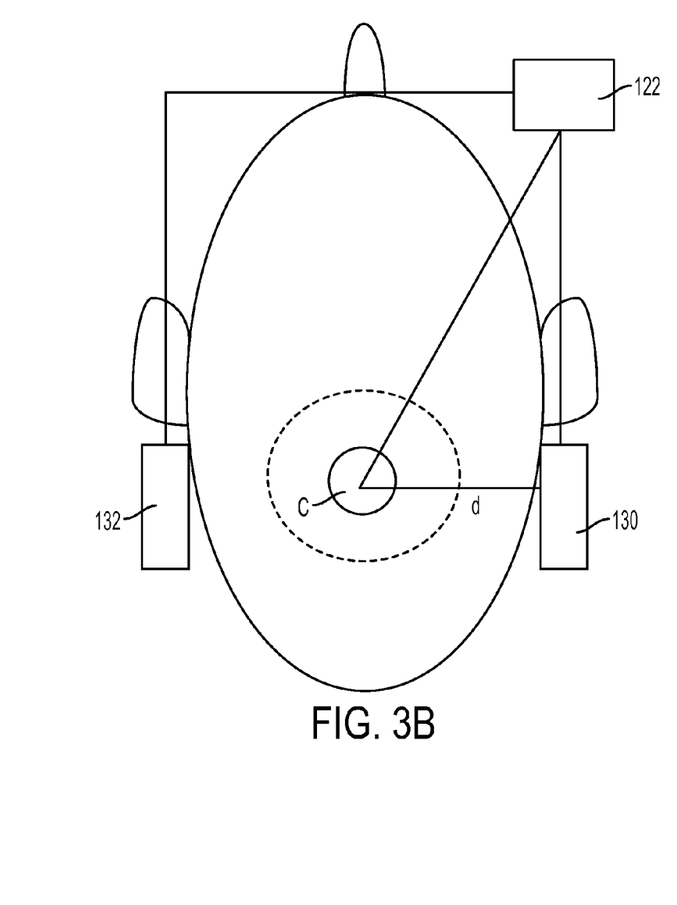
FIG. 3b is a schematic view of the center of gravity of a user of the wearable computing device shown in FIG. 1.

Placing additional mass on the back portion 104 of the wearable computing device 100 behind the ears also shortens the distance between the additional mass and the center of gravity C of the user. The center of gravity C of a user wearing the wearable computing device 100 is not located directly in the center of the head, but instead more toward the back of the head near the neck and spine, as shown in FIG. 3b. A smaller distance d between the additional mass and the center of gravity lowers the moment of inertia of the user, which is the measure of an object's resistance to changes to its rotation. Thus, a lower moment of inertia allows the user to turn their head faster while wearing the wearable computing device 100. The lower moment of inertia also reduces the feeling of the weight of the wearable display by the user, making the wearable computing device 100 seem lighter and less noticeable.

Figure 4:
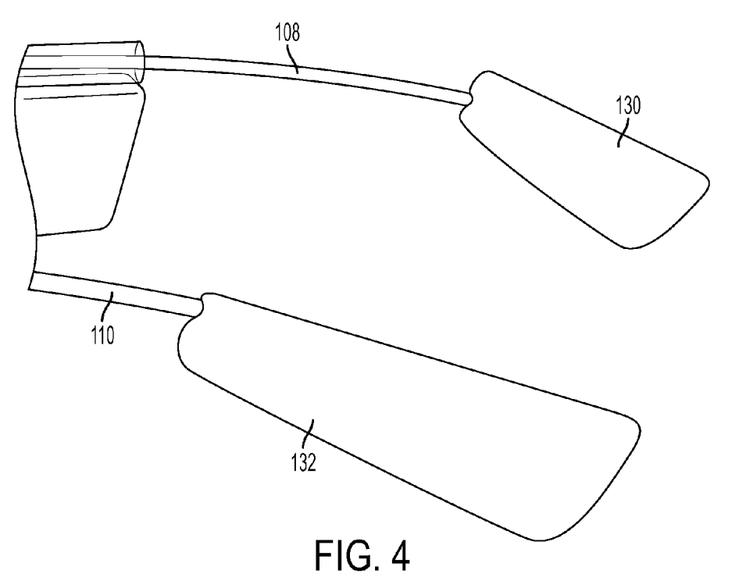
FIG. 4 is a close-up view of a back portion of the wearable computing device shown in FIG. 1.

The mass of the electronic devices 130, 132 of the wearable computing device 100 behind the ears can also be sized and shaped to create a sizeable volume that does not look and feel awkward. For instance, as shown in FIG. 4, a pyramid shape, where the pyramid gets larger at the end of the side-arms 108, 110 of the wearable computing device 100, can provide a maximum amount of counter leverage while still looking and feeling like a relatively normal pair of eyeglasses. The pyramid shape may also prevent the wearable computing device 100 from slipping off of the user's ears. The pyramid shape also facilitates the donning of the eyeglasses, as the shape creates a leading edge that can easily slide between the ears and head. Other shapes and arrangements are also possible, such as a teardrop, trapezoid, or oval shape, for example.

In some embodiments, additional components may be included on the wearable computing device 100, such as, for example, a finger-operable touch pad, a camera, an image capture device, a light source, a microphone, or a movement sensor. The movement sensor may include an accelerometer, a magnetometer, or a gyroscope, for example. The placement of these additional components may affect the forces on the user, and thus may be arranged on the wearable computing device 100 so as to evenly distribute the mass of all of the components present on the wearable computing device 100. For example, the microphone may be placed near the user's mouth at the front portion 102 of the wearable computing device 100. In order to counterbalance the additional mass of the microphone and evenly distribute the forces acting on the user, other components may be arranged toward the back portion 104 of the wearable computing device 100.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A wearable computing device comprising:
   a frame including a front portion and at least one side-arm extending therefrom, the at least one side-arm having a first end and a second end;
   a lens connected to the frame;
   a display element mounted to the lens and to the first end of the at least one side-arm of the frame, wherein the display element is configured to display a projected image or graphic; and
   at least one electronic device for counterbalancing a weight of the frame, lens, and display element, the at least one electronic device being mounted to the second end of the at least one side-arm of the frame, wherein a distance between the at least one electronic device and a center of gravity of the wearable computing device is such that a moment of force acting about an ear of a user of the wearable computing device caused by the weight of the frame, lens, and display element is substantially equal to a moment of force acting about the ear of the user caused by a weight of the at least one electronic device.

2. The wearable computing device of claim 1 wherein the electronic device is positioned behind an ear of a user of the wearable computing device.

3. The wearable computing device of claim 1 further comprising a tensile sleeve for mounting the display element to the first end of the at least one side-arm, the tensile sleeve being constructed of a material having high tensile strength and low compressive strength.

4. The wearable computing device of claim 1 further comprising a nose piece extending from the front portion of the frame, wherein the lens is connected to the frame only at the nose piece.

5. The wearable computing device of claim 1 wherein the electronic device comprises a pyramid shape.

6. The wearable computing device of claim 1 further comprising a second side-arm extending from the frame, a second display element mounted to the second lens and to the second side-arm of the frame, and a second electronic device mounted to a second end of the second side-arm and being positioned behind an ear of a user of the wearable computing device.

7. A wearable computing device comprising:
   a frame including a front portion and at least one side-arm extending therefrom, the at least one side-arm having a first end and a second end;
   a lens connected to the frame;
   means for projecting an image mounted to the lens and to the first end of the at least one side-arm of the frame;
   means for mounting the projecting means to the first end of the at least one side-arm of the frame; and
   means for counterbalancing a weight of the frame, lens, and projecting means mounted to the second end of the at least one side-arm of the frame, wherein a distance between the means for counterbalancing and a center of gravity of wearable computing device is such that a moment of force acting about an ear of a user of the wearable computing device caused by the weight of the frame, lens, and projecting means is substantially equal to a moment of force acting about the ear of the user caused by a weight of the means for counterbalancing.

8. A wearable computing device comprising:
   a frame including a front portion and at least one side-arm extending therefrom, the at least one side-arm having a first end and a second end;
   a lens connected to the frame;
   a display element mounted to the lens and to the first end of the at least one side-arm of the frame, wherein the display element is configured to display a projected image or graphic;
   a tensile member separate from and mounted on the at least one side-arm, the tensile member being configured to attach the display element to the first end of the at least one side-arm; and
   at least one electronic device for counterbalancing a weight of the frame, lens, and display element, the at least one electronic device being mounted to the second end of the at least one side-arm of the frame.

9. The wearable computing device of claim 8 wherein the electronic device is configured to be positioned behind an ear of a user of the wearable computing device.

10. The wearable computing device of claim 8 further comprising a nose piece extending from the front portion of the frame, wherein the lens is connected to the frame only at the nose piece.

11. The wearable computing device of claim 10 wherein the nose piece includes a first projection and a second projection, the lens being connected to the first projection of the nose piece and a second lens connected to the second projection of the nose piece.

12. The wearable computing device of claim 11 further comprising a second side-arm extending from the frame.

13. The wearable computing device of claim 12 further comprising a second display element mounted to the second lens and to the second side-arm of the frame.

14. The wearable computing device of claim 13 further comprising a second electronic device mounted to a second end of the second side-arm and configured to be positioned behind an ear of a user of the wearable computing device.

15. The wearable computing device of claim 8 wherein the electronic device comprises a pyramid shape.

16. The wearable computing device of claim 8 wherein the tensile member is a tensile sleeve constructed of a material having high tensile strength and low compressive strength.

17. The wearable computing device of claim 16 wherein the tensile member is made of poly-paraphenylene terephthalamide.

18. The wearable computing device of claim 8 wherein the electronic device includes a computer and at least one battery.

19. The wearable computing device of claim 8 wherein the lens is constructed of glass.

20. The wearable computing device of claim 8 wherein the frame is constructed of titanium.

21. A wearable computing device comprising:
   a frame including a front portion with first and second side-arms extending therefrom, the first and second side-arms each having first and second ends;
   a first lens and a second lens each connected to the front portion of the frame;

a first display element mounted to the first lens and to the first end of the first side-arm of the frame, wherein the first display element is configured to display a projected image or graphic;

a first tensile sleeve separate from and mounted on the first side-arm, the first tensile sleeve being configured to attach the first display element to the first end of the first side-arm of the frame;

a second display element mounted to the second lens and to the first end of the second side-arm of the frame, wherein the second display element is configured to display a respective projected image or graphic;

a second tensile sleeve separate from and mounted on the second side-arm, the second tensile sleeve being configured to attach the second display element to the first end of the second side-arm of the frame;

a first electronic device mounted to the second end of the first side-arm of the frame to counterbalance a weight of the frame, the first lens, and the first display element; and a second electronic device mounted to the second end of the second side-arm of the frame to counterbalance a weight of the frame, the second lens, and the second display element.

22. The wearable computing device of claim 21 further comprising a nose piece extending from the front portion of the frame, wherein the first and second lenses are connected to the frame only at the nose piece.

23. The wearable computing device of claim 21 wherein the first and second electronic devices are adapted to be positioned behind the ears of a user of the wearable computing device.

24. The wearable computing device of claim 21 wherein the first and second tensile sleeves are constructed of a material having high tensile strength and low compressive strength.

25. The wearable computing device of claim 24 wherein the first and second tensile sleeves are constructed of poly-paraphenylene terephthalamide.

26. A wearable computing device comprising:

a frame including a front portion and at least one side-arm extending therefrom, the at least one side-arm having a first end and a second end;

a lens connected to the front portion of the frame;

a nose piece extending from the front portion of the frame;

at least one display element mounted to the lens and to the first end of the at least one side-arm of the frame, wherein the at least one display element is configured to display a projected image or graphic;

a tensile sleeve separate from and mounted on the at least one side-arm, the tensile sleeve being configured to attach the at least one display element to the first end of the at least one side-arm of the frame, the tensile sleeve being constructed of a material having high tensile strength and low compressive strength; and an electronic device for counterbalancing a weight of the frame, lens, and at least one display element, the electronic device being mounted to the second end of the at least one side-arm of the frame, wherein a distance between the electronic device and a center of gravity of the wearable computing device is such that a moment of force acting about an ear of a user of the wearable computing device caused by the weight of the frame, lens, and at least one display element is substantially equal to a moment of force acting about the ear of the user caused by a weight of the electronic device.

27. The wearable computing device of claim 26 wherein the tensile sleeve is constructed of poly-paraphenylene terephthalamide.

* * * * *